US012273916B2

(12) United States Patent
Zhang

(10) Patent No.: US 12,273,916 B2
(45) Date of Patent: Apr. 8, 2025

(54) ENERGY DETECTION THRESHOLD VALUE DETERMINATION METHOD AND APPARATUS

(71) Applicant: GUANGDONG OPPO MOBILE TELECOMMUNICATIONS CORP., LTD., Guangdong (CN)

(72) Inventor: Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 378 days.

(21) Appl. No.: 17/743,453

(22) Filed: May 13, 2022

(65) Prior Publication Data

US 2022/0279577 A1 Sep. 1, 2022

Related U.S. Application Data

(63) Continuation of application No. PCT/CN2019/119294, filed on Nov. 18, 2019.

(51) Int. Cl.
*H04W 74/0808* (2024.01)
*H04W 72/21* (2023.01)
*H04W 72/23* (2023.01)

(52) U.S. Cl.
CPC ....... *H04W 74/0808* (2013.01); *H04W 72/21* (2023.01); *H04W 72/23* (2023.01)

(58) Field of Classification Search
None
See application file for complete search history.

(56) References Cited

U.S. PATENT DOCUMENTS 11,265,910 B2 * 3/2022 Babaei ............. H04W 74/0808
11,758,560 B2 * 9/2023 Babaei ................. H04L 1/1896
370/329

(Continued)

FOREIGN PATENT DOCUMENTS

CN 106452705 2/2017
CN 107181577 9/2017

(Continued)

OTHER PUBLICATIONS

Office Action of Japan Counterpart Application No. 2022-528353, with English translation thereof, issued on Feb. 6, 2024, pp. 1-5.

(Continued)

*Primary Examiner* — Faiyazkhan Ghafoerkhan
(74) *Attorney, Agent, or Firm* — JCIP GLOBAL INC.

(57) ABSTRACT

The present application relates to the field of wireless communications. Provided are an energy detection (ED) threshold value determination method and apparatus. The method comprises: receiving a first ED threshold value configured by a network device; and determining a second ED threshold value, the second ED threshold value being used for performing listen before talk (LBT) before uplink transmission, and the second ED threshold value being equal to or not equal to the first ED threshold value. An ED threshold value actually used during LBT before the uplink transmission can be determined, so that the network device and a terminal can reach an agreement on the ED threshold value actually used by the terminal during LBT, and the network device can determine, according to the second ED threshold value, a transmission mode for transmitting data to the terminal.

18 Claims, 5 Drawing Sheets

(56) References Cited

U.S. PATENT DOCUMENTS

| | | | |
|---|---|---|---|
| 2017/0230944 A1* | 8/2017 | Babaei | H04W 74/006 |
| 2018/0234886 A1* | 8/2018 | Bhorkar | H04W 74/0808 |
| 2018/0352577 A1* | 12/2018 | Zhang | H04B 7/08 |
| 2019/0104542 A1* | 4/2019 | Chendamarai Kannan | H04W 74/002 |
| 2019/0200389 A1* | 6/2019 | Li | H04B 7/0695 |
| 2020/0053779 A1* | 2/2020 | Jeon | H04L 5/0094 |
| 2020/0053799 A1* | 2/2020 | Jeon | H04W 16/14 |
| 2020/0107277 A1* | 4/2020 | Jeon | H04W 52/36 |
| 2020/0146054 A1* | 5/2020 | Jeon | H04W 74/006 |
| 2020/0154474 A1* | 5/2020 | Lo | H04W 72/56 |
| 2020/0229157 A1* | 7/2020 | Rastegardoost | H04L 5/0098 |
| 2020/0229227 A1* | 7/2020 | Babaei | H04W 76/11 |
| 2021/0235495 A1* | 7/2021 | Xu | H04W 74/0808 |
| 2021/0360693 A9* | 11/2021 | Iyer | H04L 5/001 |
| 2021/0410185 A1* | 12/2021 | Do | H04W 74/0808 |
| 2022/0174724 A1* | 6/2022 | Babaei | H04W 72/0446 |
| 2022/0279577 A1* | 9/2022 | Zhang | H04W 74/0808 |

FOREIGN PATENT DOCUMENTS

| | | |
|---|---|---|
| CN | 107852747 | 3/2018 |
| CN | 110120830 | 8/2019 |
| EP | 4048015 | 8/2022 |
| JP | 2019140436 | 8/2019 |
| WO | 2019195465 | 10/2019 |
| WO | 2019195589 | 10/2019 |
| WO | 2021097632 | 5/2021 |

OTHER PUBLICATIONS

Office Action of India Counterpart Application No. 202227033896, issued on Nov. 4, 2022, pp. 1-6.
Vivo, "Discussion on HARQ operation for NR-U," 3GPP TSG RAN WG1 Meeting #95 R1-1812302, Nov. 12-16, 2018, pp. 1-7.
Vivo, "Discussion on the channel access procedures", 3GPP TSG RAN WG1#99 R1-1912012, Nov. 18-22, 2019, pp. 1-10.
Vivo, "Discussion on the enhancements to configured grants," 3GPP TSG RAN WG1 #99 R1-1912015, Nov. 18-22, 2019, pp. 1-10.
LG Electronics, "Channel access procedure for NR-U," 3GPP TSG RAN WG1 Meeting #99 R1-1912389, Nov. 18-22, 2019, pp. 1-19.
LG Electronics, "Discussion on configured grant for NR-U," 3GPP TSG RAN WG1 Meeting #99 R1-1912392, Nov. 18-22, 2019, pp. 1-9.
"International Search Report (Form PCT/ISA/210) of PCT/CN2019/119294," mailed on Aug. 7, 2020, with English translation thereof, pp. 1-6.
"Written Opinion of the International Searching Authority (Form PCT/ISA/237) of PCT/CN2019/119294," mailed on Aug. 7, 2020, with English translation thereof, pp. 1-7.
"Office Action of Europe Counterpart Application, Application No. 19952970.2", issued on Jun. 20, 2023, p. 1-p. 6.
Office Action of China Counterpart Application, Application No. 202210579294.2, with English translation thereof, issued on Jun. 30, 2023, pp. 1-15.
Office Action of Canadian Counterpart Application No. 3158889, issued on Jul. 27, 2023, pp. 1-4.
Office Action of Japan Counterpart Application No. 2022-528353, with English translation thereof, issued on Aug. 8, 2023, pp. 1-5.
Office Action of China Counterpart Application No. 202210579294.2, with English translation thereof, issued on Oct. 10, 2023, pp. 1-15.
Office Action of European Counterpart Application No. 19952970.2, issued on Nov. 17, 2023, pp. 1-5.
Office Action of China Counterpart Application No. 202210579294.2, with English translation thereof, issued on Jan. 1, 2024, pp. 1-17.
"Search Report of Counterpart Europe application No. 19952970.2", issued on Sep. 13, 2022, pp. 1-10.
Office Action of Canadian Counterpart Application No. 3158889, issued on Apr. 25, 2024, pp. 1-4.
"Office Action of China Counterpart Application, Application No. 202210579294.2", with English translation thereof, issued on Nov. 15, 2024, p. 1-p. 23.
"Office Action of Japan Counterpart Application, Application No. 2022-528353", with English translation thereof, issued on Jan. 28, 2025, p. 1-p. 13.

* cited by examiner

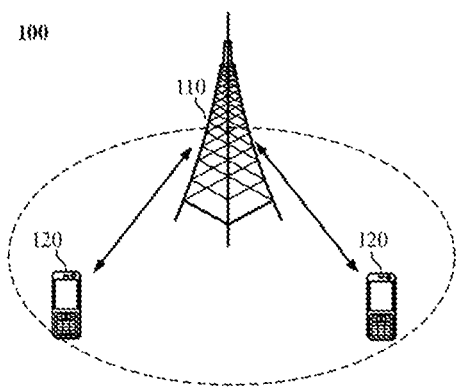
FIG. 1
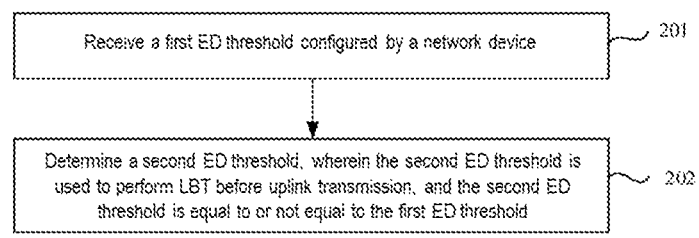
FIG. 2
FIG. 3
FIG. 4
FIG. 5

ENERGY DETECTION THRESHOLD VALUE DETERMINATION METHOD AND APPARATUS

CROSS-REFERENCE TO RELATED APPLICATION

This application is a continuation of international PCT application serial no. PCT/CN2019/119294, filed on Nov. 18, 2019. The entirety of the above-mentioned patent application is hereby incorporated by reference herein and made a part of this specification.

BACKGROUND

Technical Field

The disclosure relates to the field of wireless communication, and particularly relates to an energy detection threshold determination method and apparatus.

Description of Related Art

In order to ensure that communication systems on the unlicensed spectrum can share unlicensed spectrum resources in a fair manner, the third generation partnership project (3GPP) introduced the listen before talk (LBT) mechanism in the disclosure license assisted access (LAA) technology.

The LBT mechanism is used by a communication device (for example, a terminal) in the communication system to listen to a channel to determine an idle/busy state of the channel before each communication system accesses the channel on the unlicensed spectrum. Generally, the process of the terminal listening to the channel includes the process of detecting the energy of a carrier on the channel within a short duration (for example, 9 microseconds or 20 microseconds). When the terminal detects that the energy of the carrier on the channel is less than an energy detection (ED) threshold set in the terminal, the channel is considered to be in an idle state. In contrast, when the terminal detects that the energy of the carrier on the channel is not less than the ED threshold, the channel is considered to be in a busy state.

A base station may configure the ED threshold for the terminal. However, it is difficult for the base station to determine whether the ED threshold actually used by the terminal during the process of listening to the channel is the ED threshold configured by the base station. Therefore, there is an urgent need for a method for determining the ED threshold actually used by the terminal during the process of listening to the channel.

SUMMARY

The disclosure provides an ED threshold determination method and apparatus, which can be used for solving the issue of a method in the related art that cannot determine an ED threshold actually used by a terminal during a process of listening to a channel. The technical solutions are as follows.

In an aspect, an ED threshold determination method is provided, and the method includes the following.

A first ED threshold configured by a network device is received.

A second ED threshold is determined. The second ED threshold is used for performing listen before talk (LBT) before uplink transmission. The second ED threshold is equal to or not equal to the first ED threshold.

In an aspect, an ED threshold determination method is provided, and the method includes the following.

A first ED threshold is configured to a terminal.

A second ED threshold is determined. The second ED threshold is used by the terminal to perform listen before talk (LBT) before uplink transmission. The second ED threshold is equal to or not equal to the first ED threshold.

In an aspect, an ED threshold determination apparatus is provided, and the apparatus includes the following.

A receiving module is used for receiving a first ED threshold configured by a network device.

A processing module is used for determining a second ED threshold. The second ED threshold is used for performing listen before talk (LBT) before uplink transmission. The second ED threshold is equal to or not equal to the first ED threshold.

In an aspect, an energy detection (ED) threshold determination apparatus is provided, and the apparatus includes the following.

A processing module is used for configuring a first ED threshold to a terminal.

The processing module is used for determining a second ED threshold. The second ED threshold is used by the terminal to perform listen before talk (LBT) before uplink transmission.

The second ED threshold is equal to or not equal to the first ED threshold.

In an aspect, a terminal is provided. The terminal includes a processor and a memory. The memory stores at least one instruction. The at least one instruction is used for being executed by the processor to implement the step related to receiving the first ED threshold configured by the network device.

In an aspect, a network device is provided. The network device includes a processor and a memory. The memory stores at least one instruction. The at least one instruction is used for being executed by the processor to implement the step related to configuring the first ED threshold.

In an aspect, a computer-readable storage medium is provided. The computer-readable storage medium stores an instruction. The instruction is executed by a processor to implement the steps of any one of the methods.

The beneficial effects of the technical solutions provided in the embodiments of the disclosure include at least the following.

Through determining the ED threshold actually used during LBT before the uplink transmission, the network device and the terminal can reach an agreement on the ED threshold actually used by the terminal during LBT, so that the network device can determine a transmission mode for transmitting data to the terminal according to the second ED threshold.

BRIEF DESCRIPTION OF THE DRAWINGS

In order to explain the technical solutions in the embodiments of the disclosure more clearly, the following will briefly introduce the drawings required in the description of the embodiments. Obviously, the drawings in the following description are only some embodiments of the disclosure. For persons skilled in the art, other drawings may be obtained according to the drawings without innovative effort.

FIG. 1 is a schematic diagram of a communication system provided in an exemplary embodiment of the disclosure.

FIG. 2 is a flowchart of an ED threshold determination method provided in an exemplary embodiment of the disclosure.

FIG. 3 is a schematic diagram of a first symbol provided in an exemplary embodiment of the disclosure.

FIG. 4 is a schematic diagram of a first symbol provided in another exemplary embodiment of the disclosure.

FIG. 5 is a schematic diagram of a first symbol provided in yet another exemplary embodiment of the disclosure.

DETAILED DESCRIPTION OF DISCLOSED EMBODIMENTS

Figure 6:
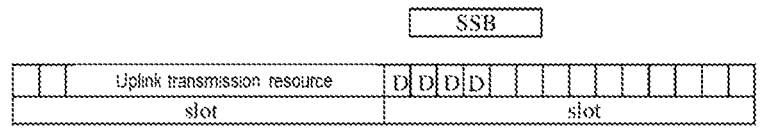
FIG. 6 is a schematic diagram of a first symbol in a second implementation manner that satisfies a first condition provided in an exemplary embodiment of the disclosure.

In order for the objectives, technical solutions, and advantages of the disclosure to be clearer, the implementation manners of the disclosure will be further described in detail below in conjunction with the drawings.

Before describing in detail a data transmission method on an unlicensed spectrum provided in the embodiments of the disclosure, terms and a communication system involved in the embodiments of the disclosure will be briefly introduced.

Unlicensed spectrum: a spectrum that may be used for radio device communication divided by countries and regions. The spectrum is usually considered to be a shared spectrum, that is, as long as communication devices in different communication systems meet regulatory requirements set by a country or a region on the spectrum, the spectrum may be used without applying for a proprietary spectrum authorization from the government.

LBT mechanism: refers to ED that needs to be performed by a transmitter on a channel for a period of time according to regulations before transmitting data to a receiver on the unlicensed spectrum, wherein the receiver and the transmitter are communication devices on the unlicensed spectrum. If a result of ED indicates that the channel is in an idle state, the transmitter may transmit the data to the receiver. If the result of ED indicates that the channel is in an occupied state, the transmitter needs to back off for a period of time according to the regulations and continue to monitor the channel until a result of monitoring indicates the idle state, and then transmit the data to the receiver. The result of ED refers to a magnitude relationship between an energy of a carrier on the channel and an ED threshold. When the energy of the carrier on the channel is less than the ED threshold, the channel is considered to be in the idle state. On the contrary, when the energy of the carrier on the channel is not less than the ED threshold, the channel is considered to be in the occupied state. Optionally, the LBT mechanism may also be referred to as an ED mechanism.

Channel occupancy time (COT): on the unlicensed spectrum, the communication device needs to perform LBT. When LBT is successful, the communication device obtains one COT for data transmission. In order to ensure fairness, during one transmission, a duration of signal transmission by the communication device using the channel of the unlicensed spectrum cannot exceed a maximum channel occupancy time (MCOT). On the unlicensed spectrum, for the COT obtained by the network device (the network device includes a network side device or a base station), the network device may share the COT with a terminal (a user equipment) for sending an uplink signal or an uplink channel. At this time, the terminal may use an LBT manner with higher priority than when trying to obtain the channel by the terminal itself, thereby obtaining a usage right of the channel with a greater probability.

It was pointed out in the 98b meeting of the radio access network (RAN) 1 that if the terminal is configured with the ED threshold by the network device, and the terminal adopts the ED threshold for LBT, at this time, when the network device shares the COT of the terminal, the network device may transmit a control channel, a broadcast channel, and a broadcast signal in the shared COT. Also, in the shared COT, the network device may also transmit the control channel, a data channel, and a reference signal to the terminal. If the terminal does not adopt the ED threshold configured by the network device during an LBT procedure, the network device can only transmit the control channel, the broadcast channel, and the broadcast signal in the shared COT, and it is difficult to transmit the control channel, the data channel, and the reference signal to the terminal. In addition, a time domain length of a signal transmitted by the network device is also limited. For subcarrier spacings (SCS) of 15 kilohertz (kHz), 30 kHz, and 60 kHz, signal lengths that can be transmitted cannot respectively exceed 2 symbols, 4 symbols, and 8 symbols.

Next, the communication system involved in the embodiments of the disclosure is briefly introduced.

The technical solutions of the embodiments of the disclosure may be applied to various communication systems compatible with the unlicensed spectrum, such as a long term evolution (LTE) system, an LTE frequency division duplex (FDD) system, an LTE time division duplex (TDD) system, an advanced long term evolution (LTE-A) system, a new radio (NR) system, an evolution system of the NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, wireless local area networks (WLAN), wireless fidelity (WiFi), a next-generation communication system, or other communication systems. The embodiments of the disclosure take the communication system as the NR-U system as an example for illustration.

Generally speaking, traditional communication systems support a limited number of connections and are easy to implement. However, with the development of communication technology, mobile communication systems will not only support traditional communication, but will also support, for example, device to device (D2D) communication, machine to machine (M2M) communication, machine type communication (MTC), vehicle to vehicle (V2V) communication, etc. The embodiments of the disclosure may also be applied to the communication systems.

The system architecture and service scenarios described in the embodiments of the disclosure are intended to illustrate the technical solutions of the embodiments of the disclosure more clearly and do not constitute a limitation on the technical solutions provided in the embodiments of the disclosure. Persons skilled in the art shall know that with the evolution of the network architecture and the emergence of new business scenarios, the technical solutions provided in the embodiments of the disclosure are equally applicable to similar technical issues.

Exemplarily, a communication system 100 applied in the embodiments of the disclosure is as shown in FIG. 1. The communication system 100 may include a network device 110. The network device 110 may be a device that communicates with a terminal 120 (also referred to as a communication terminal or a terminal). The network device 110 may provide communication coverage for a specific geographical region and may communicate with a terminal located in the coverage region. Optionally, the network device 110 may be an evolutional node B (eNB or eNodeB) in the LTE system or a wireless controller in a cloud radio access network (CRAN), or the network device may be a mobile switching center, a relay station, an access point, an in-vehicle device, a wearable device, a hub, a switch, a bridge, a router, a network device in a 5G network, a network device in a future communication system, etc.

The communication system 100 further includes at least one terminal 120 located in the coverage range of the network device 610. As used herein, the "terminal" includes, but is not limited to, connection via a wired line, such as connection via public switched telephone networks (PSTN), a digital subscriber line (DSL), a digital cable, a direct cable; another data connection/network; a wireless interface, such as for a cellular network and a wireless local area network (WLAN), a digital television network such as a DVB-H network, a satellite network, and an AM-FM broadcast transmitter; an apparatus of another terminal that is set to receive/send a communication signal; and/or an Internet of things (IoT) device. A terminal device set to communicate through the wireless interface may be referred to as a "wireless communication terminal", a "wireless terminal", or a "mobile terminal". An example of the mobile terminal includes, but is not limited to, a satellite or a cellular telephone; a personal communications system (PCS) terminal that may combine a cellular radio telephone with data processing, fax, and data communication capabilities; a PDA that may include a radio telephone, a pager, an Internet/Intranet access, a Web browser, a notebook, a calendar, and/or a global positioning system (GPS) receiver; and a conventional laptop and/or palmtop receiver or other electronic apparatuses including a radio telephone transceiver. The terminal may refer to an access terminal, a user equipment (UE), a user unit, a user station, a mobile station, a mobile platform, a remote station, a remote terminal, a mobile device, a user terminal, a terminal, a wireless communication device, a user agent, or a user apparatus. The access terminal may be a cellular telephone, a cordless telephone, a session initiation protocol (SIP) telephone, a wireless local loop (WLL) station, a personal digital assistant (PDA), a handheld device with a wireless communication function, a computing device, other processing devices, in-vehicle devices, and wearable devices connected to wireless modems, a terminal in a 5G network, a terminal device in a future evolutional PLMN, etc.

Optionally, the device to device (D2D) communication may be performed between the terminals 120

Optionally, the 5G communication system or the 5G network may also be referred to as a new radio (NR) system or a NR network.

FIG. 1 exemplarily shows a network device 110 and two terminals 120. Optionally, the communication system 100 may include multiple network devices 110, and other numbers of terminals 120 may be included in the coverage range of each network device 110, which are not limited in the embodiments of the disclosure.

Optionally, the communication system 100 may also include other network entities such as a network controller and a mobility management entity, which are not limited in the embodiments of the disclosure.

It should be understood that a device with a communication function in a network/system in the embodiments of the disclosure may be referred to as a communication device. Taking the communication system 100 shown in FIG. 1 as an example, the communication device may include the network device 110 with the communication function and the terminal 120. The network device 110 and the terminal 120 may be the specific devices described above, which will not be repeated here. The communication device may also include other devices, for example, other network entities such as the network controller and the mobility management entity, in the communication system 100, which are not limited in the embodiments of the disclosure.

Generally, the network device configures the ED threshold for the terminal for LBT. However, when the terminal performs LBT, the ED threshold actually used is not the ED threshold configured by the network device, causing it to be difficult for the network device to determine whether to adopt limited transmission or unlimited transmission to transmit data to the terminal. The limited transmission refers to that the length of the data that can be transmitted by the network device is limited, and the control channel, the data channel, and the reference signal cannot be transmitted to the terminal. Accordingly, the unlimited transmission refers that the length of the data that can be transmitted by the network device is not limited, and the control channel, the data channel, and the reference signal can be transmitted to the terminal.

FIG. 2 exemplarily shows an ED threshold determination method provided in an embodiment of the disclosure, and the method may be applied to the terminal 120 in the communication system 100 shown in FIG. 1. The method may include the following.

In Step 201, a first ED threshold configured by a network device is received.

In Step 202, a second ED threshold is determined. The second ED threshold is used for performing LBT before uplink transmission. The second ED threshold is equal to or not equal to the first ED threshold.

The second ED threshold may be the ED threshold actually used when the terminal performs LBT before the uplink transmission.

In summary, in the ED threshold determination method provided in the embodiments of the disclosure, the ED threshold actually used during LBT before the uplink transmission can be determined, so that the network device and the terminal can reach an agreement on the ED threshold actually used by the terminal during LBT, so that the network device can determine a transmission mode for transmitting data to the terminal according to the second ED threshold.

It should be noted that the network device learns the second ED threshold actually used by the terminal during LBT before the uplink transmission based on the same strategy as the terminal.

It should also be noted that in some optional implementation manners, Step 201 is an optional step.

In the embodiments of the disclosure, the network device may configure two ED thresholds for the terminal, that is, there may be two first ED thresholds, one is a general maximum ED threshold, and the other one is an ED threshold of the shared COT. The maximum ED threshold refers to the maximum ED threshold among multiple ED thresholds that can be adopted when the terminal performs LBT, and the maximum ED threshold may be agreed upon by a communication protocol. The ED threshold of the shared COT refers to the ED threshold that enables the terminal and the base station to share the COT.

Therefore, in Step 201, the received first ED threshold configured by the network device may be the maximum ED threshold or the ED threshold of the shared COT. In Step 202, determining the second ED threshold actually used during LBT before the uplink transmission may further include determining whether the second ED threshold actually used during LBT before the uplink transmission is the ED threshold of the shared COT or the maximum ED threshold. Of course, the network device may also configure other types of ED thresholds for the terminal, which is not limited in the disclosure.

In the embodiments of the disclosure, the network device configures the ED threshold for the terminal through a radio resource control (RRC) parameter, and the ED threshold may also be expressed as ED_RRC. Optionally, the second ED threshold actually used by the terminal during LBT before the uplink transmission may be expressed as ED_actual. If the second ED threshold is equal to the first ED threshold, the same may be expressed as ED_actual=ED_RRC.

It needs to be explained in advance that in the embodiments of the disclosure, an uplink transmission resource refers to an uplink transmission time domain resource.

Optionally, for Step 202, the embodiments of the disclosure provide three methods for the terminal to determine the second ED threshold. In a first determination method, the terminal may be enforced by the network device to determine the first ED threshold as the second ED threshold, so that the network device may clarify the second ED threshold actually used by the terminal during LBT before the uplink transmission. In a second determination method, the terminal determines the second ED threshold according to first information, so that the network device may also learn the second ED threshold actually used by the terminal during LBT before the uplink transmission according to the first information. In a third determination method, the terminal sends the determined second ED threshold to the network device through second information, that is, the terminal may choose the second ED threshold by itself, and inform the network device through the second information, so that the network device may learn the second ED threshold actually used by the terminal during LBT before the uplink transmission. The three determination methods are described below.

In the first determination method, the terminal determines the first ED threshold as the second ED threshold actually used during LBT before the uplink transmission. After the network device configures the first ED threshold for the terminal, the terminal may use the first ED threshold as the second ED threshold actually used during LBT before the uplink transmission under the following two scenarios. Under a first scenario, the uplink transmission is a scheduled uplink transmission, and the terminal uses the first ED threshold as the second ED threshold during LBT before the scheduled uplink transmission. Under a second scenario, the uplink transmission is a pre-configured uplink transmission, and the terminal uses the first ED threshold as the second ED threshold during LBT before the pre-configured uplink transmission.

In the second determination method, the second ED threshold actually used during LBT before the uplink transmission is determined according to the first information. Optionally, the first information includes at least one of the following two types of first information.

For a first implementation manner of the first information, the first information includes first indication information in downlink control information (DCI). Optionally, the DCI is used for scheduling the uplink transmission; or the DCI is used for triggering the pre-configured uplink transmission; or the DCI is a common group indication control signal. The common group indication control signal may include a group-common PDCCH. For example, the DCI may be DCI2_0. The full English name of PDCCH is physical downlink control channel.

The first indication information is set in the DCI used for scheduling the uplink transmission. The network device may perform targeted processing for each scheduled terminal. For example, the network device may decide which ED threshold to use for a scheduling resource of each terminal.

The first indication information is set in the DCI used for triggering the pre-configured uplink transmission. The network device may adopt activated DCI to decide which ED threshold to use for at least one pre-configured uplink resource.

Setting the first indication information in the DCI used for scheduling the uplink transmission or in the DCI used for triggering the pre-configured uplink transmission both indicate how to set the ED threshold for each terminal.

In other optional implementation manners, the network device may also set the first indication information in the common group physical downlink control channel, so that the DCI may instruct a group of terminals how to set the ED threshold. Since there is no need to instruct each terminal how to set the ED threshold, the objective of reducing control signaling overhead is achieved.

For a second implementation manner of the first information, the first information includes information of time domain units. The time domain units include a time slot, a time slot group, a symbol, a symbol group, a frame, a frame group, a subframe, a subframe group, etc. In the embodiments of the disclosure, the time domain unit including a first symbol outside an uplink transmission resource used for the uplink transmission is taken as an example for description. The first symbol may be a symbol or a symbol group.

Optionally, the uplink transmission resource includes a scheduled uplink transmission resource and a pre-configured uplink transmission resource.

Optionally, the first information is the first implementation manner, the first information is the second implementation manner, or the first information is the first implementation manner and the second implementation manner at the same time.

When the first information includes the first implementation manner, the second determination method may include the following step. When the first indication information indicates adopting the first ED threshold as the second ED threshold, the first ED threshold is the second ED threshold actually used during LBT before the uplink transmission is determined.

The first indication information is explicit indication information or implicit indication information. The first indication information may be a first bit in a designated bit domain in the DCI, wherein the first bit may include at least one bit. The designated bit domain may be a reserved bit domain in the DCI or the designated bit domain may be a multiplexed bit domain in the DCI.

In the embodiments of the disclosure, when the designated bit domain is the reserved bit domain, the first indication information is the explicit indication information. The explicit indication information refers to that the bit in the bit domain may directly indicate that the second ED threshold is the first ED threshold. The reserved bit domain refers to a bit domain in the DCI specifically used for indicating that the second ED threshold is the first ED threshold, specifically, the bit in the bit domain is used for indicating that the second ED threshold is the first ED threshold.

For example, the network device configures the first ED threshold for the terminal. After the network device completes the configuration, in the DCI used for scheduling the terminal for the uplink transmission, the terminal is indicated to use the first ED threshold as the second ED threshold for LBT. The terminal uses the first ED threshold during LBT before the scheduled uplink transmission. In the DCI, the first indication information may be the reserved bit domain with a length of 1 bit. If the bit in the bit domain indicates '1', it means that the second ED threshold is equal to the first ED threshold. On the contrary, if the bit in the bit domain indicates '0', it means that the second ED threshold is not equal to the first ED threshold.

In the embodiments of the disclosure, when the designated bit domain is the multiplexed bit domain, the first indication information is the implicit indication information. The implicit indication information refers to that the bit in the bit domain may indirectly indicate that the second ED threshold is the first ED threshold, that is, the bit in the bit domain may be used for indicating that the second ED threshold is the first ED threshold or other indication information. The multiplexed bit domain refers to multiplexing an original bit domain in the DCI. The original bit domain in the DCI may be a frequency domain resource assignment (FDRA) domain, a time domain resource assignment (TDRA) domain, a modulation and coding scheme (MCS) domain, a channel coding redundancy version (RV) domain, a physical uplink control channel resource indicator (PUCCH resource indicator) domain, a PDSCH-to-HARQ feedback timing indicator domain, and a downlink assignment index domain. The multiplexed bit domain is to multiplex any one of the bit domains.

In other optional implementation manners, a bit domain may also be set in the DCI to indicate a channel access priority class (CAPC). When the terminal determines that the CAPC indicated in the DCI is different from the CAPC of data to be uploaded in the terminal, the terminal may consider that the network device needs to share the COT with the terminal, and the terminal may use the first ED threshold as the actual second ED threshold. That is, in the implementation manner, according to a relationship between the CAPC indicated in the DCI and the CAPC of the data to be uploaded in the terminal, whether the terminal uses the first ED threshold as the actual second ED threshold is determined.

In other optional implementation manners, a bit domain may also be set in the DCI to indicate whether to share the COT of the terminal. When the terminal determines that the DCI indicates that the network device needs to share the COT with the terminal, the terminal may use the first ED threshold as the actual second ED threshold. That is, in the implementation manner, according to whether the DCI indicates that the network device needs to share the COT with the terminal, whether the terminal uses the first ED threshold as the actual second ED threshold is determined.

Of course, in the above embodiments, the DCI used for scheduling the terminal for the uplink transmission is taken as an example for description. In other optional implementation manners, the DCI may be the DCI used for activating the uplink transmission pre-configured by the terminal. For example, the network device configures the first ED threshold for the terminal. After the network device completes the configuration, in the DCI used for activating the pre-configured uplink transmission of the terminal, the terminal is indicated to use the first ED threshold as the second ED threshold for LBT. The terminal uses the first ED threshold during LBT before the pre-configured uplink transmission.

When the first information includes the second implementation manner, the second determination method may include the following step. When information of the time domain unit (including the first symbol in the embodiments of the disclosure) satisfies a first condition, the first symbol is determined to be used for indicating that the second ED threshold is the first ED threshold.

The first symbol refers to a symbol outside the uplink transmission resource. Optionally, the first symbol may include at least one of the following three types of symbols.

A first type symbol is the first symbol after the last symbol among symbols included in the uplink transmission resource.

Exemplarily, FIG. 3 schematically shows a type of the first symbol. FIG. 3 shows two time slots in the time domain, and each slot includes 14 symbols, wherein 12 of the 14 symbols included in a first slot correspond to the uplink (UL) transmission resource. It can be seen from FIG. 3 that the first symbol is a symbol D. The symbol D is the first symbol after the last symbol among the symbols included in the UL transmission resource.

A second type symbol is at least one consecutive symbol after the last symbol among the symbols included in the uplink transmission resource. The at least one symbol includes the first symbol after the last symbol.

Exemplarily, FIG. 4 schematically shows another type of the first symbol. Similar to FIG. 3, FIG. 4 shows two slots in the time domain, and each slot includes 14 symbols, wherein 12 of the 14 symbols included in the first slot correspond to the UL transmission resource. It can be seen from FIG. 4 that the first symbol includes two consecutive symbols D. The two consecutive symbols D are two consecutive symbols after the last symbol among the symbols included in the UL transmission resource. Of course, in other optional implementation manners, the first symbol may include three, four, five, or more consecutive symbols.

A third type symbol is at least one symbol from the last symbol among the symbols included in the uplink transmission resource to the first symbol among the symbols included in a pre-configured downlink transmission resource closest to the uplink transmission resource.

Exemplarily, FIG. 5 schematically shows yet another type of the first symbol. Similar to FIG. 3, FIG. 5 shows two slots in the time domain, and each slot includes 14 symbols, wherein 12 of the 14 symbols included in the first slot correspond to the UL transmission resource. FIG. 5 also shows the pre-configured downlink transmission resource closest to the UL transmission resource, for example, the downlink transmission resource corresponding to a synchronization signal block (SSB). It can be seen from FIG. 5 that the first symbol includes the symbol D. The symbol D is a symbol from the last symbol included in the UL transmission resource to the first symbol included in the downlink transmission resource corresponding to a pre-configured downlink transmission SSB.

FIG. 5 shows the pre-configured downlink transmission of the SSB for illustration. In other optional implementation manners, the pre-configured downlink transmission may be the downlink transmission of at least one SSB, channel status information reference signal (CSI-RS) transmission, physical downlink control channel (PDCCH) transmission, and physical downlink shared channel (PDSCH) transmission.

Optionally, the first condition includes at least one of the following two first conditions.

For a first implementation manner of the first condition, the first symbol is not an uplink symbol. That is, the type of the first symbol is not the uplink symbol.

For a second implementation manner of the first condition, the first symbol overlaps or partially overlaps with the symbols included in the downlink transmission resource used for the pre-configured downlink transmission.

Optionally, the first condition is the first implementation manner, the first condition is the second implementation manner, or the first condition is the first implementation manner and the second implementation manner at the same time.

The description for the first implementation manner will be continued with the first symbol described in FIG. 3 to FIG. 5 as an example.

In the first symbol described in FIG. 3, the network device configures the first ED threshold for the terminal. After the configuration is completed, the network device schedules the terminal for the uplink transmission, and the terminal determines the second ED threshold according to the first symbol outside the uplink transmission resource. The first symbol outside the uplink transmission resource refers to the first type symbol, that is, the first symbol after the last symbol among the symbols included in the uplink transmission resource. For example, the terminal determines the second ED threshold according to the type of the first symbol outside the uplink transmission resource. The type of the first symbol may include the uplink symbol, a downlink symbol, and a flexible symbol. If it is determined that the type of the first symbol D in FIG. 3 is not the uplink symbol, the terminal determines to use the first ED threshold as the second ED threshold. The terminal may obtain uplink and downlink information of the first symbol through a broadcast message (system information block, SIB), such as SIB1, of the network device. The terminal may also obtain the uplink and downlink information of the first symbol through a control message, such as a slot format indicator (SFI), sent by the network device.

In the first symbol described in FIG. 4, the network device configures the first ED threshold for the terminal. After the configuration is completed, the network device schedules the terminal for the uplink transmission, and the terminal determines the second ED threshold according to the first symbol outside the uplink transmission resource. The first symbol outside the uplink transmission resource refers to the second type symbol, that is, the at least one consecutive symbol after the last symbol among the symbols included in the uplink transmission resource, and the at least one symbol includes the first symbol after the last symbol. For example, the terminal determines the second ED threshold according to the type of the first symbol outside the uplink transmission resource. The type of the first symbol includes the uplink symbol, the downlink symbol, and the flexible symbol. If it is determined that the types of the two consecutive symbols D in FIG. 4 are both not the uplink symbols, the terminal determines to use the first ED threshold as the second ED threshold. The terminal may obtain the uplink and downlink information of the first symbol through the SIB1 of the network device. The terminal may also obtain the uplink and downlink information of the first symbol through the control message, such as SFI, sent by the network device.

In the first symbol described in FIG. 5, the network device configures the first ED threshold for the terminal. After the configuration is completed, the network device schedules the terminal for the uplink transmission, and the terminal determines the second ED threshold according to the first symbol outside the uplink transmission resource. The first symbol outside the uplink transmission resource refers to the third type symbol, that is, the at least one symbol from the last symbol among the symbols included in the uplink transmission resource to the first symbol among the symbols included in the pre-configured downlink transmission resource closest to the uplink transmission resource. For example, the terminal determines the second ED threshold according to the type of the first symbol outside the uplink transmission resource. The type of the first symbol includes the uplink symbol, the downlink symbol, and the flexible symbol. If it is determined that the type of the symbol D of a spacing between the uplink transmission resource and the pre-configured downlink transmission resource in FIG. 5 is not the uplink symbol, the terminal determines to use the first ED threshold as the second ED threshold. In the embodiment described in FIG. 5, the symbol of the spacing is the symbol D. In other optional implementation manners, the number of symbols of the spacing may be multiple, for example, two, three, or more. The number of symbols of the spacing may be related to the SCS. For example, when the SCS is 15 kHz and 30 kHz, the number of symbols of the spacing may be one or two, and when the SCS is 60 kHz, the number of symbols of the spacing may be one, two, or three.

For the second implementation manner, please refer to FIG. 6. The first symbol in the second implementation manner may also be any of the first type to the third type of the first symbol. The following takes the first symbol as the second type of the first symbol as an example for description.

FIG. 6 schematically shows the second implementation manner of the first symbol that satisfies the first condition. Similar to FIG. 3, FIG. 6 shows two slots in the time domain, and each slot includes 14 symbols, wherein 12 of the 14 symbols included in the first slot correspond to the UL transmission resource. FIG. 6 also shows the pre-configured downlink transmission closest to the UL transmission resource, for example, the downlink transmission resource corresponding to the SSB. It can be seen from FIG. 6 that the first symbol includes four consecutive symbols D, and the four consecutive symbols D include the first symbol after the last symbol included in the UL transmission resource. The four symbols partially overlap with the pre-configured downlink transmission SSB, that is, the overlap of the three symbols. FIG. 6 shows the pre-configured downlink transmission of the SSB for illustration. In other optional implementation manners, the pre-configured downlink transmission may be at least one of the downlink transmission of SSB transmission, the CSI-RS transmission, the PDCCH transmission, and the PDSCH transmission.

It is worth noting that the descriptions of FIG. 3 to FIG. 6 are that the network device configures the first ED threshold for the terminal. After the network device completes the configuration, when the network device schedules the terminal for the uplink transmission, the terminal determines the second ED threshold. In other optional implementation manners, the embodiments described in FIG. 3 to FIG. 6 may also be that the network device configures the first ED threshold for the terminal. After the network device completes the configuration, when the network device pre-configures the uplink transmission of the terminal, the terminal determines the second ED threshold.

For example, taking the embodiment shown in FIG. 6 as an example, the network device configures the first ED threshold for the terminal. After the network device completes the configuration, the network device pre-configures the uplink transmission of the terminal. The terminal determines the second ED threshold according to the symbol of the spacing between the uplink transmission resource and the closest pre-configured downlink transmission resource.

Optionally, as mentioned in the introduction of the first information, the first information may be the first implementation manner of the first information and the second implementation manner of the first information at the same time, that is, the first information may include the first indication information in the DCI and the information of the time domain unit at the same time.

In the second determination method, a process of the terminal determining the second ED threshold actually used during LBT before the uplink transmission according to the first information may include the following.

If the first indication information does not indicate adopting the first ED threshold as the second ED threshold, the second ED threshold actually used during LBT before the uplink transmission is determined according to the first indication information and the information of the time domain unit. The time domain unit is a time domain unit after the uplink transmission resource used for the uplink transmission, and the time domain unit may be used for representing one or a section of time domain region. In some embodiments of the disclosure, the time domain unit may be the first symbol. Of course, the time domain unit may also be in other forms than the symbol, which is not limited in the disclosure.

In the third determination method, the ED threshold selected or determined by the terminal itself is determined as the second ED threshold actually used during LBT before the uplink transmission.

The terminal may choose whether to use the first ED threshold as the second ED threshold actually used during LBT. When the terminal does not use the first ED threshold as the second ED threshold, the terminal may determine a standard ED threshold pre-appointed in the communication protocol as the second ED threshold or the terminal may calculate to obtain the second ED threshold according to factors such as a target calculation equation and conditions of a channel that needs to be monitored. The target calculation equation may be indicated by the network device or determined by the communication protocol. The above are only several implementation manners in which the terminal does not use the first ED threshold configured by the network device as the second ED threshold provided in the embodiments of the disclosure. Of course, the embodiments of the disclosure may also include other optional implementation manners, which will not be repeated here.

After the terminal selects the ED threshold by itself, the determination method of the energy detection threshold provided in the embodiments of the disclosure may include the following step. The second information is sent to the network device. The second information is used for indicating the second ED threshold actually used during LBT before the uplink transmission.

The second ED threshold may be equal to or not equal to the first ED threshold. Optionally, the second information includes at least one of the following: uplink control information, uplink data information, the uplink transmission resource actually transmitted during the uplink transmission (or the type of the uplink transmission resource actually transmitted during the uplink transmission), and an uplink demodulation reference signal (DMRS) of the uplink transmission (or the type of the uplink DMRS of the uplink transmission). Optionally, the second information may include second indication information. The second indication information is used for indicating the second ED threshold actually used during LBT before the uplink transmission. The network device determines the second ED threshold used by the terminal according to the second indication information in the received second information.

Figure 7:
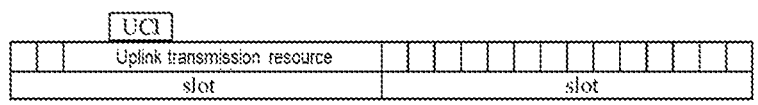
FIG. 7 is a schematic diagram of an uplink control channel and an uplink transmission resource transmitted together according to an exemplary embodiment of the disclosure.

Taking the second information including the uplink control information as an example, the network device configures the first ED threshold for the terminal. After the configuration is completed, the network device pre-configures the uplink transmission of the terminal. The terminal selects whether the second ED threshold is equal to the first ED threshold, and the terminal notifies the network device a self-selected result through the uplink control information on the uplink control channel. For example, the uplink control information is configured grant-uplink control information (CG-UCI). For example, as shown in FIG. 7, the CG-UCI may be set in the pre-configured uplink transmission resource for the uplink transmission and transmitted together with a physical uplink shared channel (PUSCH). FIG. 7 is a schematic diagram of the uplink control information and the uplink transmission resource being transmitted together. The network device determines the second ED threshold used by the terminal according to the second indication information in the UCI after receiving the CG-UCI.

Similar to the first indication information, the second indication information may be the explicit indication information or the implicit indication information. For explanations related to the explicit indication information and the implicit indication information, reference may be made to the first indication information, and the embodiments of the disclosure will not be repeated here.

For example, when the second indication information is the explicit indication information, the second indication information may be a bit domain with a length of 1 bit. If the bit indicates '1', it means that the second ED threshold is equal to the first ED threshold. On the contrary, if the bit in the bit domain indicates '0', it means that the second ED threshold is not equal to the first ED threshold.

For example, when the second indication information is the implicit indication information, the second indication information used for indicating the second ED threshold may make an agreement with the indication information in other bit domains. For example, the second indication information and the CG-UCI are used for indicating whether to share COT information to make the agreement. If terminal indicates that sharing of the COT is allowed, the second ED threshold is equal to the first ED threshold.

It should also be noted that the first ED threshold may be the ED threshold used during LBT before the terminal initially establishes the COT in the case where the terminal shares the COT with the base station.

In summary, in the ED threshold determination method provided in the embodiments of the disclosure, the ED threshold actually used during LBT before the uplink transmission may be determined, so that the network device and the terminal can reach the agreement on the ED threshold actually used by the terminal during LBT, so that the network device can determine the transmission mode for transmitting data to the terminal according to the second ED threshold.

Moreover, when the first ED threshold set by the network device is the threshold of the shared COT, the network device may learn whether the second ED threshold actually used by the terminal is the threshold of the shared COT. When the second ED threshold used by the terminal is the threshold of the shared COT, the network device may transmit the control channel, the broadcast channel, and the broadcast signal in the shared COT, and in the shared COT, the network device transmits the control channel, the data channel, and the reference signal to the terminal. The efficiency of the network device sending data to the terminal is effectively improved.

Figure 8:
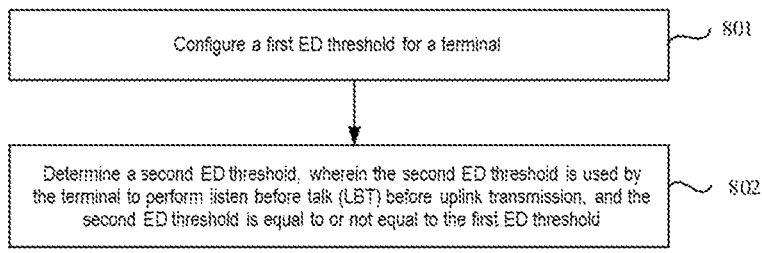
FIG. 8 is a flowchart of an ED threshold determination method provided in another exemplary embodiment of the disclosure.

FIG. 8 shows an ED threshold determination method provided in an embodiment of the disclosure. The method may be applied to the network device 110 in the communication system 100 shown in FIG. 1, and the network device 110 may be an access point device, that is, the base station. Optionally, the method may include the following.

In Step 801, the first ED threshold is configured for the terminal.

In Step 802, the second ED threshold is determined. The second ED threshold is used by the terminal to perform listen before talk (LBT) before the uplink transmission. The second ED threshold is equal to or not equal to the first ED threshold.

In summary, in the ED threshold determination method provided in the embodiment of the disclosure, the ED threshold actually used by the terminal during LBT before the uplink transmission can be determined, so that the network device and the terminal can reach the agreement on the ED threshold actually used by the terminal during LBT, so that the network device can determine the transmission mode for transmitting data to the terminal according to the second ED threshold.

Optionally, in the embodiment of the disclosure, Step 802 may include the following three determination methods.

In the first determination method, the first ED threshold is determined as the second ED threshold.

In the second determination method, the second ED threshold is determined according to the first information.

Optionally, the first information includes at least one of the following: the first indication information in the downlink control information (DCI), wherein the DCI is used for scheduling the uplink transmission, or the DCI is used for triggering the pre-configured uplink transmission, or the DCI is the common group indication control signal; and the information of the time domain unit, wherein the time domain unit is not used for the uplink transmission.

Optionally, the second determining method may include the following step. When the first indication information indicates adopting the first ED threshold as the second ED threshold, the first ED threshold is determined as the second ED threshold, wherein the first indication information is the explicit indication information or the implicit indication information.

Optionally, the first indication information is the first bit in the designated bit domain in the DCI. The designated bit domain is the reserved bit domain or the multiplexed bit domain in the DCI.

Optionally, when the information of the time domain unit satisfies the first condition, the information of the time domain unit is determined to be used for indicating that the second ED threshold is the first ED threshold.

Optionally, the information of the time domain unit includes at least one of the following: the first symbol after the last symbol among the symbols included in the uplink transmission resource; at least one consecutive symbol after the last symbol among the symbols included in the uplink transmission resource, wherein the at least one symbol includes the first symbol after the last symbol; and the at least one symbol from the last symbol among the symbols included in the uplink transmission resource to the first symbol among the symbols included in the pre-configured downlink transmission resource closest to the uplink transmission resource.

Optionally, the first condition may include at least one of the following: the information of the time domain unit is not the uplink symbol; and the first symbol overlaps or partially overlaps with the symbols included in the downlink transmission resource used for the pre-configured downlink transmission.

Optionally, a first pre-configured downlink transmission includes at least one of the following: the synchronization signal block (SSB) transmission; the channel status information reference signal (CSI-RS) transmission; the physical downlink control channel (PDCCH) transmission; and the physical downlink shared channel (PDSCH) transmission.

Optionally, the first information includes the first indication information and the information of the time domain unit in the DCI. The determination of the second ED threshold according to the first information includes the following step.

If the first indication information does not indicate adopting the first ED threshold as the second ED threshold, the second ED threshold is determined according to the first indication information and the information of the time domain unit.

In the third determination method, the second ED threshold is determined according to the second information.

In the third determination method, before Step 802, the determination of the ED threshold may further include the following step. The network device receives the second information. The second information is used for indicating whether the second ED threshold actually used during LBT before the uplink transmission is equal to or not equal to the first ED threshold.

Optionally, the second information includes at least one of the following: the uplink control information; the uplink data information; the uplink transmission resource actually transmitted during the uplink transmission; and the uplink DMRS of the uplink transmission.

Optionally, in the above embodiment, the configured first ED threshold is the ED threshold of the shared channel occupancy time (COT) of the terminal or the configured first ED threshold is the maximum ED threshold.

In summary, in the ED threshold determination method provided in the embodiments of the disclosure, the ED threshold actually used during LBT before the uplink transmission can be determined, so that the network device and the terminal can reach the agreement on the ED threshold actually used by the terminal during LBT, so that the network device can determine the transmission mode for transmitting data to the terminal according to the second ED threshold.

Moreover, when the first ED threshold set by the network device is the threshold of the shared COT, the network device may learn whether the second ED threshold actually used by the terminal is the threshold of the shared COT. When the second ED threshold used by the terminal is the threshold of the shared COT, the network device may transmit the control channel, the broadcast channel, and the broadcast signal in the shared COT, and in the shared COT, the network device transmits the control channel, the data channel, and the reference signal to the terminal. The efficiency of the network device sending data to the terminal is effectively improved.

It should be noted that for the relevant description of the ED threshold determination method provided for the network device, reference may be made to the relevant discussion of the ED threshold determination method provided for the terminal, and the embodiments of the disclosure will not be repeated here.

For the three methods for determining the second ED threshold for the terminal, three flowcharts of the interaction between the terminal and the network device are provided below.

Figure 9:
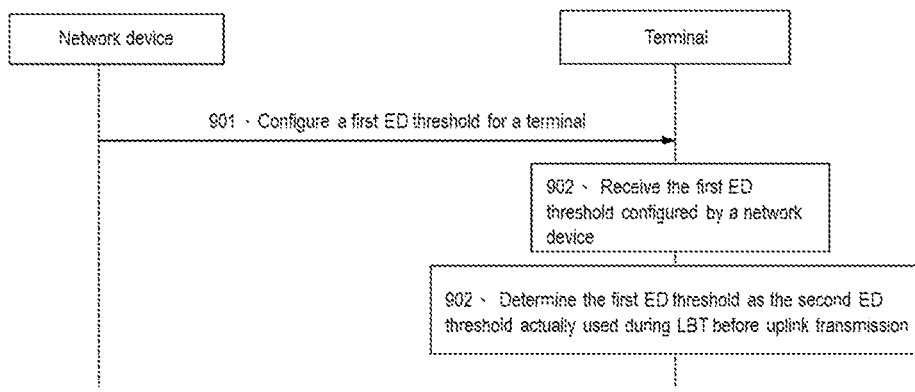
FIG. 9 is a flowchart of an ED threshold determination method applying a first determination method according to an exemplary embodiment of the disclosure.

FIG. 9 is directed to the first determination method. The ED threshold determination method applying the first determination method may include the following steps.

In Step 901, the network device configures the first ED threshold for the terminal.

The first ED threshold may be the ED threshold of the shared COT of the terminal or the maximum ED threshold.

In Step 902, the terminal receives the first ED threshold configured by the network device.

In Step 903, the terminal determines the first ED threshold as the second ED threshold actually used by the terminal during LBT.

In the ED threshold determination method shown in FIG. 9, the network device enforces the terminal to determine the first ED threshold configured by the network device for the terminal as the second ED threshold actually used by the terminal during LBT.

Figure 10:
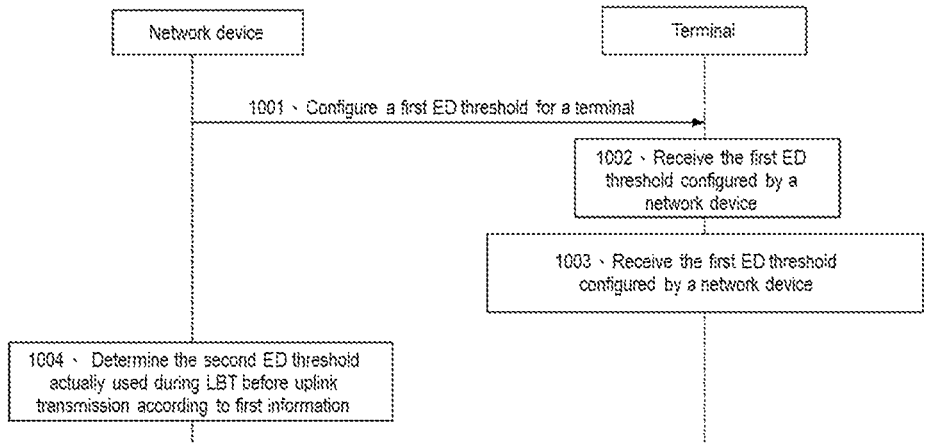
FIG. 10 is a flowchart of an ED threshold determination method applying a second determination method according to an exemplary embodiment of the disclosure.

FIG. 10 is directed to the second determination method. The ED threshold determination method applying the second determination method may include the following steps.

In Step 1001, the network device configures the first ED threshold for the terminal.

The first ED threshold may be the ED threshold of the shared COT of the terminal or the maximum ED threshold.

In Step 1002, the terminal receives the first ED threshold configured by the network device.

In Step 1003, the terminal determines the second ED threshold actually used by the terminal during LBT according to the first information.

The terminal determines the second ED threshold actually used during LBT before the uplink transmission according to at least one of the first indication information in the DCI included in the first information and the first symbol outside the uplink transmission resource.

In Step 1004, the network device determines the second ED threshold actually used by the terminal during LBT according to the first information.

The network device determines the second ED threshold actually used during LBT before the uplink transmission according to at least one of the first indication information in the DCI included in the first information and the first symbol outside the uplink transmission resource.

It should be noted that the embodiment of the disclosure does not limit the execution sequence of Step 1003 and Step 1004, that is, Step 1003 and Step 1004 may be executed at the same time, Step 1003 may be executed first before executing Step 1004, etc.

In the ED threshold determination method shown in FIG. 10, when the first information includes the first indication information in the DCI, since the DCI is sent to the terminal by the network device, the second ED threshold actually used by the terminal during LBT before the uplink transmission can be determined, and the network device can also determine whether the second ED threshold actually used by the terminal is the first ED threshold according to the first indication information in the DCI sent to the terminal. When the first information includes the first symbol outside the uplink transmission resource, since the network device may configure for the terminal configuration information for determining a slot format through a system message or a radio resource control (abbreviated as RRC) signaling, the network device may learn the symbols included in the uplink transmission resource and the symbol type of each symbol outside the uplink transmission resource. Of course, the symbol type of the first symbol outside the uplink transmission resource is included. That is, the terminal and the network device can both determine whether the second ED threshold actually used by the terminal is the first ED threshold according to the first information.

Figure 11:
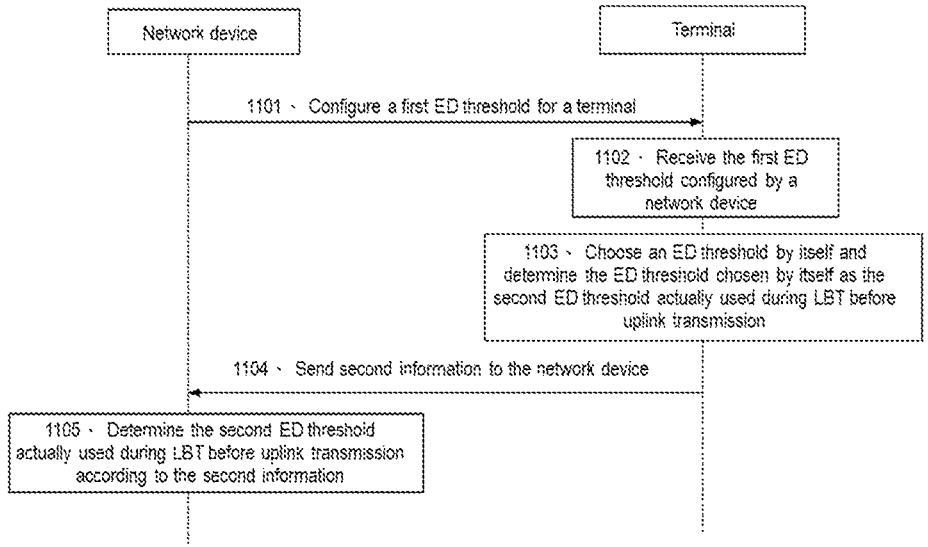
FIG. 11 is a flowchart of an ED threshold determination method applying a third determination method according to an exemplary embodiment of the disclosure.

FIG. 11 is directed to the third determination method. The ED threshold determination method applying the third determination method may include the following steps.

In Step 1101, the network device configures the first ED threshold for the terminal.

The first ED threshold may be the ED threshold of the shared COT of the terminal or the maximum ED threshold.

In Step 1102, the terminal receives the first ED threshold configured by the network device.

In Step 1103, the terminal chooses the ED threshold by itself and determines the ED threshold chosen by itself as the second ED threshold actually used by the terminal during LBT.

The terminal may choose whether to use the first ED threshold as the second ED threshold actually used during LBT.

In Step 1104, the terminal sends the second information to the network device.

The terminal sends the second information to the network device based on the self-selected result. The second information may include at least one of the uplink control information, the uplink data information, the uplink transmission resource actually transmitted during the uplink transmission, and the uplink DMRS of the uplink transmission.

In Step 1105, the network device determines the second ED threshold actually used by the terminal during LBT according to the second information.

The network device may determine the second ED threshold actually used during LBT before the uplink transmission according to the indication information in the second information. The indication information may be the implicit indication information or the explicit indication information.

In the ED threshold determination method shown in FIG. 11, the terminal chooses the second ED threshold actually used during LBT, and then informs the network device through the second information, so that the terminal and the network device can both determine whether the second ED threshold actually used by the terminal is the first ED threshold according to the first information.

For other descriptions related to the above steps, reference may be made to the above embodiments, and the embodiments of the disclosure will not be repeated here.

Figure 12:
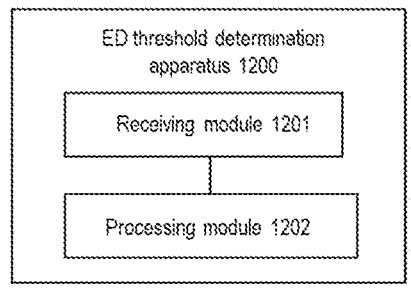
FIG. 12 is a block diagram of an ED threshold determination apparatus provided in an embodiment of the disclosure.

FIG. 12 shows an ED threshold determination apparatus 1200 provided in the embodiment of the disclosure, and the apparatus includes the following.

A receiving module 1201 is used for receiving the first ED threshold configured by the network device.

A processing module 1202 is used for determining the second ED threshold. The second ED threshold is used for performing listen before talk (LBT) before the uplink transmission. The second ED threshold is equal to or not equal to the first ED threshold.

In summary, the ED threshold determination apparatus provided in the embodiment of the disclosure can determine the ED threshold actually used during LBT before the uplink transmission, so that the network device and the terminal can reach the agreement on the ED threshold actually used by the terminal during LBT, so that the network device can determine the transmission mode for transmitting data to the terminal according to the second ED threshold.

Optionally, the processing module 1202 is used for:
determining the first ED threshold as the second ED threshold.

Optionally, the processing module 1202 is used for:
determining the second ED threshold according to the first information.

Optionally, the first information includes at least one of the following:
the first indication information in the downlink control information (DCI), wherein the DCI is used for scheduling the uplink transmission, or the DCI is used for triggering the pre-configured uplink transmission, or the DCI is the common group indication control signal;
the information of the time domain unit, wherein the time domain unit is not used for the uplink transmission.

Optionally, the processing module 1202 is used for:
when the first indication information indicates adopting the first ED threshold as the second ED threshold, determining that the first ED threshold is the second ED threshold,
wherein the first indication information is the explicit indication information or the implicit indication information.

Optionally, the first indication information is the first bit in the designated bit domain in the DCI. The designated bit domain is the reserved bit domain or the multiplexed bit domain in the DCI.

Optionally, the processing module 1202 is used for:
when the information of the time domain unit satisfies the first condition, determining that the information of the time domain unit is used for indicating that the second ED threshold is the first ED threshold.

Optionally, the first condition includes at least one of the following:
the information of the time domain unit is not the uplink symbol;
the information of the time domain unit overlaps or partially overlaps with the symbols included in the downlink transmission resource used for the pre-configured downlink transmission.

Optionally, the first symbol includes at least one of the following:
the first symbol after the last symbol among the symbols included in the uplink transmission resource;
the at least one consecutive symbol after the last symbol among the symbols included in the uplink transmission resource, wherein the at least one symbol includes the first symbol after the last symbol;
the at least one symbol from the last symbol among the symbols included in the uplink transmission resource to the first symbol among the symbols included in the pre-configured downlink transmission resource closest to the uplink transmission resource.

Optionally, the pre-configured downlink transmission includes at least one of the following:
the synchronization signal block (SSB) transmission;
the channel status information reference signal (CSI-RS) transmission;
the physical downlink control channel (PDCCH) transmission;
the physical downlink shared channel (PDSCH) transmission.

The first information includes the first indication information in the DCI and the information of the time domain unit.

The processing module 1202 is used for:
if the first indication information does not indicate adopting the first ED threshold as the second ED threshold, determining the second ED threshold according to the first indication information and the information of the time domain unit.

Figure 13:
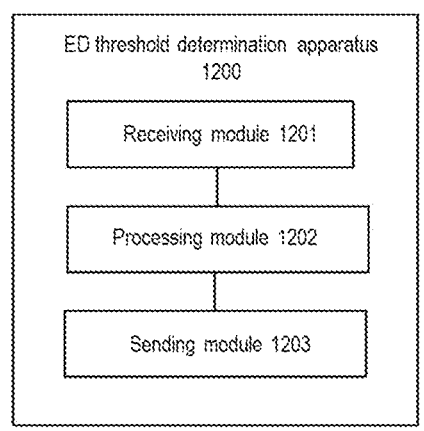
FIG. 13 is a block diagram of another ED threshold determination apparatus provided in an embodiment of the disclosure.

Optionally, as shown in FIG. 13, the device 1200 further includes the following.

A sending module 1203 is used for sending the determined second ED threshold to the network device through the second information. The second information is used for indicating the second ED threshold.

Optionally, the second information includes at least one of the following: the uplink control information; the uplink data information; the uplink transmission resource actually transmitted during the uplink transmission; and the uplink demodulation reference signal (DMRS) for the uplink transmission.

Optionally, the first ED threshold is the ED threshold of the shared channel occupancy time (COT) or the first ED threshold is the maximum ED threshold.

In summary, in the ED threshold determination method provided in the embodiment of the disclosure, the ED threshold actually used during LBT before the uplink transmission can be determined, so that the network device and the terminal can reach the agreement on the ED threshold actually used by the terminal during LBT, so that the network device can determine the transmission mode for transmitting data to the terminal according to the second ED threshold.

Moreover, when the first ED threshold set by the network device is the threshold of the shared COT, the network device may learn whether the second ED threshold actually used by the terminal is the threshold of the shared COT. When the second ED threshold used by the terminal is the threshold of the shared COT, the network device may transmit the control channel, the broadcast channel, and the broadcast signal in the shared COT, and in the shared COT, the network device transmits the control channel, the data channel, and the reference signal to the terminal. The efficiency of the network device sending data to the terminal is effectively improved.

Figure 14:
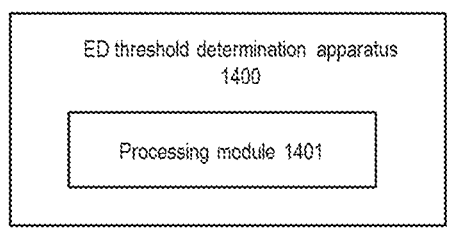
FIG. 14 is a block diagram of another ED threshold determination apparatus provided in an embodiment of the disclosure.

FIG. 14 shows another ED threshold determination apparatus 1400 provided in the embodiment of the disclosure, and the apparatus 1400 includes the following.

A processing module 1401 is used for configuring the first ED threshold for the terminal.

The processing module 1401 is used for determining the second ED threshold. The second ED threshold is used by the terminal to perform listen before talk (LBT) before the uplink transmission. The second ED threshold is equal to or not equal to the first ED threshold.

In summary, the ED threshold determination apparatus provided in the embodiment of the disclosure can determine the ED threshold actually used during LBT before the uplink transmission, so that the network device and the terminal can reach the agreement on the ED threshold actually used by the terminal during LBT, so that the network device can determine the transmission mode for transmitting data to the terminal according to the second ED threshold.

Optionally, the processing module 1401 is used for:
determining the first ED threshold as the second ED threshold.

Optionally, the processing module 1401 is used for:
determining the second ED threshold according to the first information.

Optionally, the first information includes at least one of the following:
the first indication information in the downlink control information (DCI), wherein the DCI is the DCI used for scheduling the uplink transmission, the DCI is the DCI used for triggering the pre-configured uplink transmission, or the DCI is the common group indication control signal;
the information of the time domain unit, wherein the time domain unit is not used for the uplink transmission.

Optionally, the processing module 1401 is used for:
when the first indication information indicates adopting the first ED threshold as the second ED threshold, determining that the first ED threshold is the second ED threshold,
wherein the first indication information is the explicit indication information or the implicit indication information.

Optionally, the first indication information is the first bit in the designated bit domain in the DCI. The designated bit domain is the reserved bit domain or the multiplexed bit domain in the DCI.

Optionally, the processing module 1401 is used for:
when the information of the time domain unit satisfies the first condition, determining that the information of the time domain unit is used for indicating that the second ED threshold is the first ED threshold.

Optionally, the first condition includes at least one of the following: the information of the time domain unit is not the uplink symbol; the information of the time domain unit overlaps or partially overlaps with the symbols included in the downlink transmission resource used for the pre-configured downlink transmission.

Optionally, the information of the time domain unit includes at least one of the following: the first symbols after the last symbol among the symbols included in the uplink transmission resource;
the at least one consecutive symbol after the last symbol among the symbols included in the uplink transmission resource, wherein the at least one symbol includes the first symbol after the last symbol;
the at least one symbol from the last symbol among the symbols included in the uplink transmission resource to the first symbols among the symbols included in the pre-configured downlink transmission resource closest to the uplink transmission resource.

Optionally, the first pre-configured downlink transmission includes at least one of the following: the synchronization signal block (SSB) transmission; the channel status information reference signal (CSI-RS) transmission; the physical downlink control channel (PDCCH) transmission; and the physical downlink shared channel (PDSCH) transmission.

Optionally, the first information includes the first indication information in the DCI and the information of the time domain unit at the same time.

The processing module 1401 is used for:
if the first indication information does not indicate adopting the first ED threshold as the second ED threshold, determining the second ED threshold according to the first indication information and the information of the time domain unit.

Figure 15:
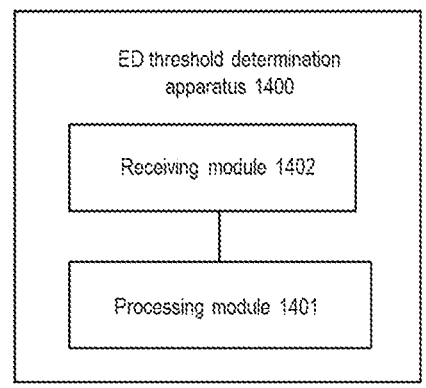
FIG. 15 is a block diagram of another ED threshold determination apparatus provided in an embodiment of the disclosure.

Optionally, as shown in FIG. 15, the apparatus 1400 includes the following.

A receiving module 1402 is used for receiving the second information before determining the second ED threshold. The second information is used for indicating whether the second ED threshold actually used during LBT before the uplink transmission is equal to or not equal to the first ED threshold.

The processing module 1401 is used for:
according to the second information, determining the second ED threshold.

Optionally, the second information includes at least one of the following: the uplink control information; the uplink data information; the uplink transmission resource actually transmitted during the uplink transmission; and the uplink demodulation reference signal (DMRS) of the uplink transmission.

Optionally, the configured first ED threshold is the ED threshold of the shared channel occupancy time (COT) of the terminal or the configured first ED threshold is the maximum ED threshold.

In summary, the ED threshold determination apparatus provided in the embodiment of the disclosure can determine the ED threshold actually used during LBT before the uplink transmission, so that the network device and the terminal can reach the agreement on the ED threshold actually used by the terminal during LBT, so that the network device can determine the transmission mode for transmitting data to the terminal according to the second ED threshold.

Moreover, when the first ED threshold set by the network device is the threshold of the shared COT, the network device may learn whether the second ED threshold actually used by the terminal is the threshold of the shared COT. When the second ED threshold used by the terminal is the threshold of the shared COT, the network device may transmit the control channel, the broadcast channel, and the broadcast signal in the shared COT, and in the shared COT, the network device transmits the control channel, the data channel, and the reference signal to the terminal. The efficiency of the network device sending data to the terminal is effectively improved.

Figure 16:
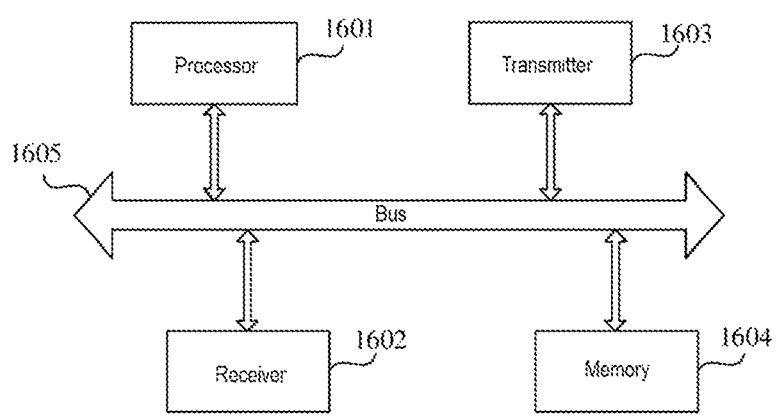
FIG. 16 is a structural schematic diagram of a communication device provided in an embodiment of the disclosure.

FIG. 16 shows a structural schematic diagram of a communication device, that is, a terminal or a network device, provided in an exemplary embodiment of the disclosure. The communication device includes a processor 1601, a receiver 1602, a transmitter 1603, a memory 1604, and a bus 1605.

The processor 1601 includes one or more processing cores. The processor 1201 executes various functional applications and information processing through running a software program and a module.

The receiver 1602 and the transmitter 1603 may be implemented as one communication component. The communication component may be a communication chip.

The memory 1604 is connected to the processor 1601 through the bus 1605.

The memory 1604 may be used for storing at least one instruction. The processor 1601 is used for executing the at least one instruction to implement each step executed by the network device in the above embodiments of the method.

In addition, the memory 1604 may be implemented by any type of volatile or non-volatile storage device or a combination thereof. The volatile or non-volatile storage device includes, but is not limited to, a magnetic disk or an optical disk, an electrically-erasable programmable read-only memory (EEPROM), an erasable programmable read-only memory (EPROM), a static random access memory (SRAM), a read-only memory (ROM), a magnetic memory, a flash memory, or a programmable read-only memory (PROM).

The disclosure provides a computer-readable storage medium. The computer-readable storage medium stores at least one instruction. The at least one instruction is loaded and executed by the processor to implement the ED threshold determination method provided in the above embodiments of the method.

Persons skilled in the art should be aware that in one or more of the above examples, the functions described in the embodiments of the disclosure may be implemented by hardware, software, firmware, or any combination thereof. When implemented by software, the functions may be stored in a computer-readable medium or transmitted as one or more instructions or codes on the computer-readable medium. The computer-readable medium includes a computer storage medium and a communication medium, wherein the communication medium includes any medium that facilitates the transfer of a computer program from one place to another. The storage medium may be any available medium that can be accessed by a general-purpose or specific-purpose computer.

The above are only optional embodiments of the disclosure and are not intended to limit the disclosure. Any modification, equivalent replacement, improvement, etc. made within the spirit and principle of the disclosure shall be included in the protection scope of the disclosure.

What is claimed is:

1. An energy detection (ED) threshold determination method, wherein the method comprises:
 receiving a first ED threshold configured by a network device;
 determining a second ED threshold, wherein the second ED threshold is used for performing listen before talk (LBT) before uplink transmission, and the second ED threshold is equal to or not equal to the first ED threshold;
 sending the determined second ED threshold to the network device through second information, wherein the second information is used for indicating the second ED threshold, the second information comprises:
  uplink control information, the uplink control information is configured grant-uplink control information (CG-UCI), the CG-UCI is used for indicating whether sharing channel occupancy time (COT);
  second indication information, the second indication information is used for indicating the second ED threshold;
 the second indication is implicit indication information, the second indication is used for indicating the second ED threshold comprises:
  in response to the CG-UCI indicating sharing COT, the second ED threshold equals to the first ED threshold.

2. The method according to claim 1, wherein the first ED threshold is an ED threshold of value of a shared channel occupancy time (COT), and the ED threshold of the shared COT refers to an ED threshold that enables a terminal and the network device to share a COT.

3. The method according to claim 1, wherein determining the second ED threshold comprises:
 determining the second ED threshold according to first information, and the first information comprises first indication information in a downlink control information (DCI).

4. The method according to claim 3, wherein the DCI is used for scheduling uplink transmission, and the DCI is further configured for indicating adopting the first ED threshold as the second ED threshold.

5. The method according to claim 3, wherein the DCI is used for triggering pre-configured uplink transmission,
 and the first indication information is implicit indication information.

6. The method according to claim 5, wherein the first indication information multiplexing a channel coding redundancy version (RV) domain in the DCI.

7. An energy detection (ED) threshold determination method, wherein the method comprises:
 configuring a first ED threshold for a terminal;
 determining a second ED threshold, wherein the second ED threshold is used by the terminal to perform listen before talk (LBT) before uplink transmission, and the second ED threshold is equal to or not equal to the first ED threshold, before determining the second ED threshold, the method comprises:
 receiving second information, wherein the second information is used for indicating the second ED threshold, the second information comprises:
  uplink control information, the uplink control information is configured grant-uplink control information (CG-UCI), the CG-UCI is used for indicating whether sharing channel occupancy time (COT);
  second indication information, the second indication information is used for indicating the second ED threshold,
 the second indication is implicit indication information, the second indication is used for indicating the second ED threshold comprises:
  in response to the CG-UCI indicating sharing COT, the second ED threshold equals to the first ED threshold.

8. The method according to claim 7, wherein the first ED threshold is an ED threshold of value of a shared channel occupancy time (COT), and the ED threshold of the shared COT refers to an ED threshold that enables the terminal and a network device to share a COT.

9. The method according to claim 7, wherein the method comprises:
    determining the second ED threshold according to first information, and the first information comprises
    first indication information in a downlink control information (DCI).

10. The method according to claim 9, wherein the DCI is used for scheduling uplink transmission, and the DCI is further configured for indicating adopting the first ED threshold as the second ED threshold.

11. The method according to claim 9, wherein the DCI is used for triggering pre-configured uplink transmission, and the first indication information is implicit indication information.

12. The method according to claim 11, wherein the first indication information multiplexing a channel coding redundancy version (RV) domain in the DCI.

13. An energy detection (ED) threshold determination apparatus, wherein the apparatus comprises:
    a receiver, wherein the receiver is used for receiving a first ED threshold configured by a network device;
    a processor, wherein the processor is used for determining a second ED threshold, the second ED threshold is used for performing listen before talk (LBT) before uplink transmission, and the second ED threshold is equal to or not equal to the first ED threshold;
    a transmitter, wherein the transmitter is used for sending the determined second ED threshold to the network device through second information, the second information is used for indicating the second ED threshold, the second information comprises:
        uplink control information, the uplink control information is configured grant-uplink control information (CG-UCI), the CG-UCI is used for indicating whether sharing channel occupancy time (COT);
        second indication information, the second indication information is used for indicating the second ED threshold,
    the second indication is implicit indication information, the second indication is used for indicating the second ED threshold comprises:
        in response to the CG-UCI indicating sharing COT, the second ED threshold equals to the first ED threshold.

14. The apparatus according to claim 13, wherein the first ED threshold is an ED threshold of value of a shared channel occupancy time (COT), and the ED threshold of the shared COT refers to an ED threshold that enables a terminal and the network device to share a COT.

15. The apparatus according to claim 13, wherein the processor is used for:
    determining the second ED threshold according to first information.

16. An energy detection (ED) threshold determination apparatus, wherein the apparatus comprises:
    a processor, wherein the processor is used for configuring a first ED threshold for a terminal,
    the processor is used for determining a second ED threshold, the second ED threshold is used by the terminal to perform listen before talk (LBT) before uplink transmission, and the second ED threshold is equal to or not equal to the first ED threshold;
    a receiver, wherein the receiver is used for receiving second information, wherein the second information is used for indicating the second ED threshold, the second information comprises:
        uplink control information, the uplink control information is configured grant-uplink control information (CG-UCI), the CG-UCI is used for indicating whether sharing channel occupancy time (COT);
        second indication information, the second indication information is used for indicating the second ED threshold,
    the second indication is implicit indication information, the second indication is used for indicating the second ED threshold comprises:
        in response to the CG-UCI indicating sharing COT, the second ED threshold equals to the first ED threshold.

17. The apparatus according to claim 16, wherein the first ED threshold is an ED threshold of value of a shared channel occupancy time (COT), and the ED threshold of the shared COT refers to an ED threshold that enables the terminal and a network device to share a COT.

18. The apparatus according to claim 16, wherein the processor is used for:
    determining the second ED threshold according to first information.

* * * * *